United States Patent [19]

van der Heem

[11] 4,221,771
[45] Sep. 9, 1980

[54] PREPARATION OF DAWSONITE

[75] Inventor: Peter van der Heem, Perryville, Md.

[73] Assignee: J. M. Huber Corporation, Locust, N.J.

[21] Appl. No.: 32,623

[22] Filed: Apr. 23, 1979

Related U.S. Application Data

[63] Continuation-in-part of Ser. No. 007,287, Jan. 29, 1979, abandoned, which is a continuation of Ser. No. 899,630, Apr. 24, 1978, abandoned.

[51] Int. Cl.$^2$ .............................................. C01B 31/24
[52] U.S. Cl. ................................................ 423/419 P
[58] Field of Search .................... 423/415, 419, 419 P, 423/421, 427; 424/154, 156

[56] References Cited

U.S. PATENT DOCUMENTS

| | | | |
|---|---|---|---|
| 2,783,127 | 2/1957 | Grote | 423/428 X |
| 2,783,179 | 2/1957 | Grote | 423/419 X |
| 2,992,884 | 7/1961 | Blenstock et al. | 423/244 R |
| 3,115,387 | 12/1963 | Lewin | 423/422 |
| 3,360,345 | 12/1967 | Lewin | 424/156 X |
| 3,389,975 | 6/1968 | Van Nordstrand | 423/115 |
| 3,501,264 | 3/1970 | Pilato et al. | 423/628 |
| 3,518,064 | 6/1970 | Lewin | 423/422 |
| 3,557,025 | 1/1971 | Emerson et al. | 423/419 P |
| 3,629,153 | 12/1971 | Pryor | 252/463 |
| 3,859,413 | 1/1975 | Haas | 423/119 X |
| 3,911,090 | 10/1975 | Hem | 423/419 |
| 4,053,568 | 10/1977 | Madaus et al. | 423/419 P |
| 4,053,579 | 10/1977 | Kato et al. | 423/419 P |

FOREIGN PATENT DOCUMENTS

| | | |
|---|---|---|
| 19784 | 2/1882 | Fed. Rep. of Germany . |
| 1,573,310 | 7/1969 | France . |
| 47-38318 | 9/1972 | Japan . |

*Primary Examiner*—Earl C. Thomas
*Attorney, Agent, or Firm*—Ernest A. Schaal; Harold H. Flanders

[57] ABSTRACT

Dawsonite is formed by reacting alumina trihydrate with sodium bicarbonate in a sodium carbonate solution under pressure at a temperature between 100° and 200° C. for 30 minutes to 4 hours. The alumina trihydrate concentration is no greater than 86 grams per liter. The sodium carbonate concentration is between 150 and 300 grams per liter. Sufficient sodium bicarbonate is added to react with all the alumina trihydrate according to the equation:

$$2Al(OH)_3 + 2NaHCO_3 = Na_2O:Al_2O_3:2CO_2:2H_2O + 2H_2O$$

The resulting dawsonite is of high purity.

10 Claims, No Drawings

4,221,771

PREPARATION OF DAWSONITE

CROSS-REFERENCE TO RELATED APPLICATION

This application is a continuation-in-part of co-pending U.S. Application Ser. No. 007,287 filed Jan. 29, 1979, and now abandoned, which is a continuation of U.S. Application Ser. No. 899,630 filed Apr. 24, 1978, and now abandonded.

DESCRIPTION OF THE PRIOR ART

1. Field of the Invention

In general, the present invention relates to the production of dawsonite, and more especially, to the production of high purity dawsonite by a one-step process.

2. Background of the Prior Art

Dawsonite is a naturally occurring crystalline material, the composition of which is $Na_2O:Al_2O_3:2CO_2:2H_2O$.

Dawsonite and the other alkali metal alumino carbonates are useful in several applications including, for example: in antiacid compositions, as an antiperspirant, as a fire extinguishing powder, as an ingredient for self-extinguishing plastics, as an ingredient for fire retardant intumescent paints and as a blowing agent.

U.S. Pat. No. 2,783,179 discloses a product described as dihydroxy aluminum sodium carbonate which might be considered by some as identical to dawsonite. Its preparation is slow and expensive. Aluminum isopropylate is added to a sodium bicarbonate solution at 45°–50° C. The mixture is allowed to stand overnight, filtered, washed and dried.

The product of U.S. Pat. No. 2,783,127 might be similar as described under U.S. Pat. No. 2,783,179. Solutions of an aluminum salt and sodium bicarbonate are mixed at 60° C., kept for 4 hours at 60°–70° C. and left overnight, filtered, washed and dried.

The compounds described in U.S. Pat. No. 3,115,387 ($Al_2O_3:H_2O:NaHCO_3$) have a composition different from dawsonite.

In U.S. Pat. No. 3,501,264 dawsonite is prepared by mixing solutions of an aluminum salt and of an alkali metal carbonate at temperatures between 20° and 95° C., followed by cooling and aging of the slurry for more than 2 hours.

In U.S. Pat. No. 3,911,090 crystalline aluminum hydroxy carbonate is prepared from an aqueous aluminum chloride solution with sodium carbonate and bicarbonate at room temperature in the presence of an alkali metal silicate.

The reaction products claimed in U.S. Pat. No. 3,518,064 are sodium alumino carbonates, but they are very different in composition from dawsonite. The products are prepared by dry heating aluminum hydroxide and sodium bicarbonate.

In U.S. Pat. No. 3,629,153 the preparation of dawsonite consists of the addition of ammonium carbonate to a sodium aluminate solution. No pressure is applied.

In U.S. Pat. No. 2,992,884 the alkali metal alumina carbonate was prepared by adding an alkali metal carbonate solution to an aluminum sulfate solution at 90° C. The resulting product contained 6.3% sulfur dioxide.

In U.S. Pat. No. 3,389,975 a sodium alumino carbonate is prepared by passing carbon dioxide gas through a leachate from shale oil containing dissolved aluminum, sodium carbonate and sodium hydroxide.

French Pat. No. 1,573,310 is similar to U.S. Pat. No. 2,992,884.

In German Pat. No. 19,784 sodium or potassium alumino carbonate is prepared by simultaneously adding gaseous carbon dioxide and a sodium or potassium aluminate solution to a solution of sodium or potassium bicarbonate.

In Japanese Pat. No. 72-38,318 dawsonite is prepared from sodium carbonate, aluminum salt and sodium hydroxide solutions at a temperature of 50° C. and a pH of 9.8. A by-product of this reaction is sodium hydroxide.

In Zeitschrift fuer Electrochemie, E. Bader 50, Nr 11/12, 266–267, 1944, dawsonite is prepared by passing carbon dioxide through a solution of sodium aluminate and sodium hydroxide. The temperature is between 20° and 95° C. and the pressure is from 1 to 20 atmospheres.

In Nippon Kagaku Kaishi, Kim et al. 1974, (11), 2705–2780, potassium dawsonite is prepared from potassium aluminate and carbon dioxide. The temperature is 80°–90° C. and the potassium oxide to aluminum oxide ratio is between 8 and 10.

Proc. Inc. Clay Conf. 1972 (Publ. 1973) 361–365 by Serratora et al. shows in saturated boiling solutions of sodium carbonate various aluminum containing substances form dawsonite. Processes are generally slow. Potassium carbonate is somewhat more active than soda ash.

The Bureau of Mines Report of Investigations RI 7664 by Jackson et al., 1972 reports on recrystallization of dawsonite using commercial dawsonite as raw material and heating it under carbon dioxide pressure (10 to 25 psig) with large excess of sodium carbonate and sodium hydroxide. The sodium to aluminum ratio is between 27 and 43.

In the Bureau of Mines, Republic of the Philippines Report of Investigation No. 72, Cada et al., June 1972, sodium aluminate solutions were "decomposed" with gaseous carbon dioxide. Temperatures were in the range of 25° to 100° C. In some cases dawsonite was obtained.

U.S. Pat. No. 3,360,345 discloses heating finely divided aluminum hydroxide and a bicarbonate salt in the absence of free water to produce an antiacid compound.

U.S. Pat. No. 3,557,025 discloses contacting a selectively calcined hydrated alumina with a bicarbonate salt to produce a compound having the empirical formula $MAl(OH)_2CO_3$. No sodium carbonate is present in the process.

U.S. Pat. No. 3,859,413 discloses a method of forming aluminum trihydrate.

U.S. Pat. No. 4,053,568 discloses adding aluminum sulfate to an alkali hydrogen carbonate or an alkali carbonate.

U.S. Pat. No. 4,053,579 discloses the production of aluminum carbonate hydroxide ammonium.

SUMMARY OF THE INVENTION

Accordingly, it is an object of this invention to provide a new and highly effective process for producing dawsonite.

It is a further object of this invention to provide a process for the production of dawsonite having a yield of close to 100%.

A further object of this invention is to provide a process for the production of dawsonite involving no intermediate product.

Still another object of this invention is to provide a process for the production of dawsonite which yields a dawsonite of higher purity than that of the prior art.

A still further object of this invention is to provide a process for the production of dawsonite wherein the crystallization is fast and complete.

Still another object of this invention is to provide a process for the production of dawsonite wherein there are less by-products of the process to be disposed of.

A still further object of this invention is to provide a process for the production of dawsonite which does not involve the addition of any sodium hydroxide or gaseous carbon dioxide.

Other objects and a fuller understanding of the invention may be had by referring to the following description and claims.

The present invention overcomes the deficiencies of the prior art and achieves its objectives by reacting alumina trihydrate with sodium bicarbonate in a sodium carbonate solution. The alumina trihydrate is preferably gibbsite and the alumina trihydrate concentration is no greater than 86 grams/liter, preferably between 65 and 75 grams/liter. The sodium bicarbonate concentration is added in sufficient amount to react with all the alumina trihydrate according to the equation:

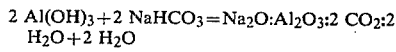

$$2\ Al(OH)_3 + 2\ NaHCO_3 = Na_2O{:}Al_2O_3{:}2\ CO_2{:}2\ H_2O + 2\ H_2O$$

but less than 150 grams per liter, preferably between 52 and 82 grams per liter. Any unused sodium bicarbonate is recycled back into the reaction. The sodium carbonate concentration is between 150 and 300 grams/liter, preferably between 150 and 200 grams/liter. The reaction temperature is between 100° and 200° C., preferably between 170° and 180° C. The reaction time is between 30 minutes and 4 hours, preferably between 105 and 135 minutes. The reaction pressure is above atmospheric pressure, preferably below 18 kg/cm², more preferably between 8.7 and 9.5 kg/cm².

DESCRIPTION OF THE PREFERRED EMBODIMENTS

In its broadest aspect, the present invention is based on the discovery that dawsonite of high purity can be made by the one-step process of reacting alumina trihydrate with sodium bicarbonate in a sodium carbonate solution at a temperature between 100° and 200° C. for between 30 minutes and 4 hours at above atmospheric pressure. The alumina trihydrate concentration is no greater than 86 grams/liter. The sodium bicarbonate is added in sufficient amount to react with all the alumina trihydrate according to the equation:

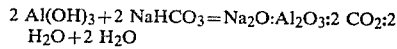

$$2\ Al(OH)_3 + 2\ NaHCO_3 = Na_2O{:}Al_2O_3{:}2\ CO_2{:}2\ H_2O + 2\ H_2O$$

The sodium carbonate concentration is between 150 and 300 grams/liter.

The alumina trihydrate is preferably gibbsite but a gelatinous amorphous alumina trihydrate will also work. The concentration of the alumina trihydrate is no greater than 86 grams/liter but is preferably between 65 and 75 grams/liter.

The sodium bicarbonate concentration must be sufficient to react with all the alumina trihydrate but less than 150 grams/liter. The sodium bicarbonate concentration is preferably between 52 and 82 grams/liter. Any unused sodium bicarbonate is recycled back into the reaction.

The sodium carbonate concentration is between 150 and 300 grams/liter. Preferably, the sodium carbonate concentration is between 150 and 200 grams/liter. This sodium carbonate does not participate in the main reaction but serves only as a reaction medium to adjust pH. The pH of the reaction medium must be at least 10. There is a side reaction wherein the sodium ions of the sodium carbonate replace sodium ions from the dawsonite, but this causes no net change in the resulting product. The sodium carbonate is recycled back to the reaction after the solids have been filtered out.

The reaction is carried out under pressure. This pressure is preferably under 18 kg/cm², more preferably between 8.7 and 9.5 kg/cm².

The reaction takes between 30 minutes and 4 hours for temperatures from 100° to 200° C. An inferior product is produced when the process is operated at temperatures out of this range. The preferred temperature range is from 170° to 180° C., and the preferred reaction time is between 105 and 135 minutes.

In a preferred embodiment, between 65 and 75 grams/liter of gibbsite is reacted with between 52 and 82 grams/liter of sodium bicarbonate in a sodium carbonate solution having a concentration of between 150 and 200 grams/liter. This reaction is carried out at between 170° and 180° C. at a pressure of between 8.7 and 9.5 kg/cm² for between 105 and 135 minutes.

The invention will be further illustrated by the following examples which set forth particularly advantageous method and composition embodiments. While the examples prove to illustrate the present invention, they are not intended to limit it thereto.

All experiments were performed using a 2 liter pressure reactor containing 1 liter of water. The crystallinity was identified with x-ray diffraction patterns. The intensity of a standard dawsonite was arbitrarily chosen as 100%.

The stoichiometric yield is estimated from the alumina trihydrate used in the reaction mixture by the formula:

$$\%\ \text{Yield} = \frac{(\text{Actual yield}) \times 100}{\frac{288}{156} \times (\text{Alumina trihydrate used})}$$

This value can differ from the percent crystallinity. The percent crystallinity is obtained from a comparison of the peaks of the sample to that of a dawsonite standard. The percent crystallinity is a measure of how well defined the crystals are. As the crystal size decreases, the sum of the peaks also decreases, although the sample is a pure dawsonite. Thus, the percent crystallinity only tells the quality of the sample as compared to the standard.

EXAMPLE 1

54 grams of alumina trihydrate was reacted with 160 grams of sodium carbonate and 63 grams of sodium bicarbonate at 175° C. for 2 hours. The resulting product was dawsonite having a yield of 100%, a LOI of 41.8%, and an x-ray intensity of 71%.

EXAMPLE 2

54 grams of alumina trihydrate was reacted with 250 grams of sodium carbonate and 79 grams of sodium bicarbonate at 175° C. for 2 hours. The resulting product was dawsonite having a yield of 100%, a LOI of 42.6%, and an x-ray intensity of 67%.

EXAMPLE 3

65 grams of alumina trihydrate was reacted with 160 grams of sodium carbonate and 76 grams of sodium bicarbonate at 175° C. for 2 hours. The resulting product was dawsonite having a yield of 95% and a LOI of 42.3%.

EXAMPLE 4

70 grams of alumina trihydrate was reacted with 160 grams of sodium carbonate and 82 grams of sodium bicarbonate at 175° C. for 2 hours. The resulting product was dawsonite with a yield of 96% and a LOI of 42.9%.

EXAMPLE 5

76 grams of alumina trihydrate was reacted with 160 grams of sodium carbonate and 88 grams of sodium bicarbonate at 175° C. for 2 hours. The resulting product was a dawsonite slurry having a LOI of 42.7% that was too thick to filter.

CONTROL EXAMPLES

Examples A-O are control examples outside the scope of the present invention which serve to illustrate the present invention.

EXAMPLE A 54 grams of alumina trihydrate was reacted with 300 grams of sodium carbonate at 175° C. for 2 hours. The resulting product was dawsonite having a yield of 66%, a LOI of 40.0%, and an x-ray intensity of 116%.

EXAMPLE B 54 grams of alumina trihydrate was reacted with 200 grams of sodium carbonate and 158 grams of sodium bicarbonate at 175° C. for 2 hours. The resulting product was an impure dawsonite having a yield of 100%, a LOI of 28.5%, and an x-ray intensity of 67%.

EXAMPLE C 54 grams of alumina trihydrate was reacted with 314 grams of sodium carbonate and 118 grams of sodium hydroxide at 175° C. for 2 hours. No dawsonite was formed.

EXAMPLE D 54 grams of alumina trihydrate was reacted with 200 grams of sodium carbonate and 158 grams of sodium bicarbonate at 95° C. for 2 hours. The resulting product was gibbsite.

EXAMPLE E 54 grams of alumina trihydrate was reacted with 471 grams of sodium carbonate at 200° C. for 2 hours. The resulting product was a blend of dawsonite and gibbsite.

EXAMPLE F 54 grams of alumina trihydrate was reacted with 314 grams of sodium carbonate and 248 grams of sodium bicarbonate at 175° C. for 2 hours. The resulting product was a very thick slurry of dawsonite.

EXAMPLE G 54 grams of alumina trihydrate was reacted with 257 grams of sodium carbonate and 203 grams of sodium bicarbonate at 175° C. for 2 hours. The resulting product was an impure dawsonite having a yield of 100%, a LOI of 29.7%, and an x-ray intensity of 60%.

EXAMPLE H 54 grams of alumina trihydrate was reacted with 250 grams of sodium carbonate and 38 grams of sodium hydroxide at 175° C. for 2 hours. No dawsonite was formed.

EXAMPLE I 54 grams of alumina trihydrate was reacted with 250 grams of sodium carbonate at 175° C. for 2 hours. The resulting product was dawsonite having a yield of 63%, a LOI of 39.2%, and an x-ray intensity of 107%.

EXAMPLE J 54 grams of alumina trihydrate was reacted with 250 grams of sodium carbonate for 175° C. for 4 hours. The resulting product was dawsonite having a yield of 64%, a LOI of 35.2%, and an x-ray intensity of 90%.

EXAMPLE K 54 grams of alumina trihydrate was reacted with 200 grams of sodium carbonate at 175° C. for 2 hours. The resulting product was and mpure dawsonite having a yield of 54%, a LOI of 29.0%, and an x-ray intensity of 52%.

EXAMPLE L 54 grams of alumina trihydrate was reacted with 200 grams of sodium carbonate at 175° C. for 4 hours. The resulting product was an impure dawsonite having a yield of 49%, a LOI of 20.8%, and an x-ray intensity of 9%.

EXAMPLE M 54 grams of alumina trihydrate was reacted with 175 grams of sodium carbonate and 40 grams of sodium bicarbonate at 175° C. for 2 hours. The resulting product was dawsonite having a yield of 92%, a LOI of 42.4%, and an x-ray intensity of 79%.

EXAMPLE N 54 grams of alumina trihydrate was reacted with 175 grams of sodium carbonate and 40 grams of sodium bicarbonate at 175° C. for 4 hours. The resulting product was dawsonite having a yield of 93%, a LOI of 41.6%, and an x-ray intensity of 104%.

EXAMPLE O 54 grams of alumina trihydrate was reacted with 190 grams of sodium carbonate and 16 grams of sodium bicarbonate at 175° C. for 2 hours. The resulting product was dawsonite having a yield of 72%, a LOI of 40.1%, and an x-ray intensity of 127%.

TABLE I

| Example | Yield, % | LOI, % | X-Ray Product | Intensity, % |
|---|---|---|---|---|
| 1 | 100 | 41.8 | D | 71 |
| 2 | 100 | 42.6 | D | 67 |
| 3 | 95 | 42.3 | D | — |
| 4 | 96 | 42.9 | D | — |
| 5 | ? | 42.7 | D | — |
| CONTROL EXAMPLES | | | | |
| A | 66 | 40.0 | D | 116 |
| B | 100 | 28.5 | D | 67 |
| C | 0 | — | — | — |

TABLE I-continued

| Example | Yield, % | LOI, % | X-Ray Product | Intensity, % |
|---|---|---|---|---|
| D | 62 | 35.4 | Gibbsite | — |
| E | 100 | 28.3 | D + Gibbsite | 72 |
| F | ? | 43.3 | D | 56 |
| G | 100 | 29.7 | D | 60 |
| H | 0 | — | — | — |
| I | 63 | 39.2 | D | 107 |
| J | 64 | 35.2 | D | 90 |
| K | 54 | 29.0 | D | 52 |
| L | 49 | 20.8 | D | 9 |
| M | 92 | 42.4 | D | 79 |
| N | 93 | 41.6 | D | 104 |
| O | 72 | 40.1 | D | 127 |

X-ray diffraction patterns were used to determine the nature of crystalline material formed (D stands for dawsonite) but because of the small particle size of these materials x-ray intensity is a poor measure of the degree of crystallinity. A better measure of crystallinity is percent loss on ignition (%LOI). If the dawsonite was 100% crystalline, it would have had a % LOI of 43.1, which is the sum of the percentage of water and of carbon dioxide in dawsonite. Examples 1 through 5, which are examples of the present invention, have an average LOI of 42.5%. Examples 4 and 5 have an average LOI of 42.6%. Examples 4 and 5 are preferred embodiments of the invention.

Besides having a higher degree of crystallinity than the control examples, the examples of the present invention have a higher yield than that of the control examples. The average yield for the examples of the present invention is 97.8% as compared to an average yield of 65.4% for the control examples.

Thus in operation, high grade dawsonite is formed by reacting alumina trihydrate with sodium bicarbonate in sodium carbonate solution at above atmospheric pressure at a temperature between 100° and 200° C. for between 30 minutes and 4 hours.

While the present invention has been described with reference to specific embodiments, this application is intended to cover those various changes and substitutions which may be made by those skilled in the art without departing from the spirit and scope of the appended claims.

I claim:

1. A process for the production of dawsonite comprising: reacting alumina trihydrate with sodium bicarbonate in a sodium carbonate solution, wherein the alumina trihydrate concentration is no greater than 86 grams/liter of said sodium carbonate solution, wherein the sodium bicarbonate is added in sufficient amount to react with all of the alumina trihydrate according to the equation:

$$2Al(OH)_3 + 2NaHCO_3 = Na_2O \cdot Al_2O_3 \cdot 2CO_2 \cdot 2H_2O + 2H_2O$$

but is less than 150 grams/liter, wherein the sodium carbonate concentration is from 150 to 300 grams/liter, and the reaction is at between 100° and 200° C. for from 30 minutes to 4 hours at above atmospheric pressure.

2. A process according to claim 1 wherein the alumina trihydrate is gibbsite.

3. A process according to claim 1 wherein the alumina trihydrate concentration is between 65 and 75 grams/liter.

4. A process according to claim 1 wherein the sodium bicarbonate concentration is between 52 and 82 grams/liter.

5. A process according to claim 1 wherein any unused sodium bicarbonate is recycled back into the reaction.

6. A process according to claim 1 wherein the sodium carbonate concentration is between 150 and 200 grams/liter.

7. A process according to claim 1 wherein the reaction temperature is between 170° and 180° C.

8. A process according to claim 1 wherein the reaction time is between 105 and 135 minutes.

9. A process according to claim 1 wherein the pressure is below 18 kg/cm².

10. A process according to claim 9 wherein the pressure is between 8.7 and 9.5 kg/cm².